C. HERRESHOFF.
GAS OR GASOLENE ENGINE CONSTRUCTION.
APPLICATION FILED APR. 30, 1907.
940,650.
Patented Nov. 16, 1909.
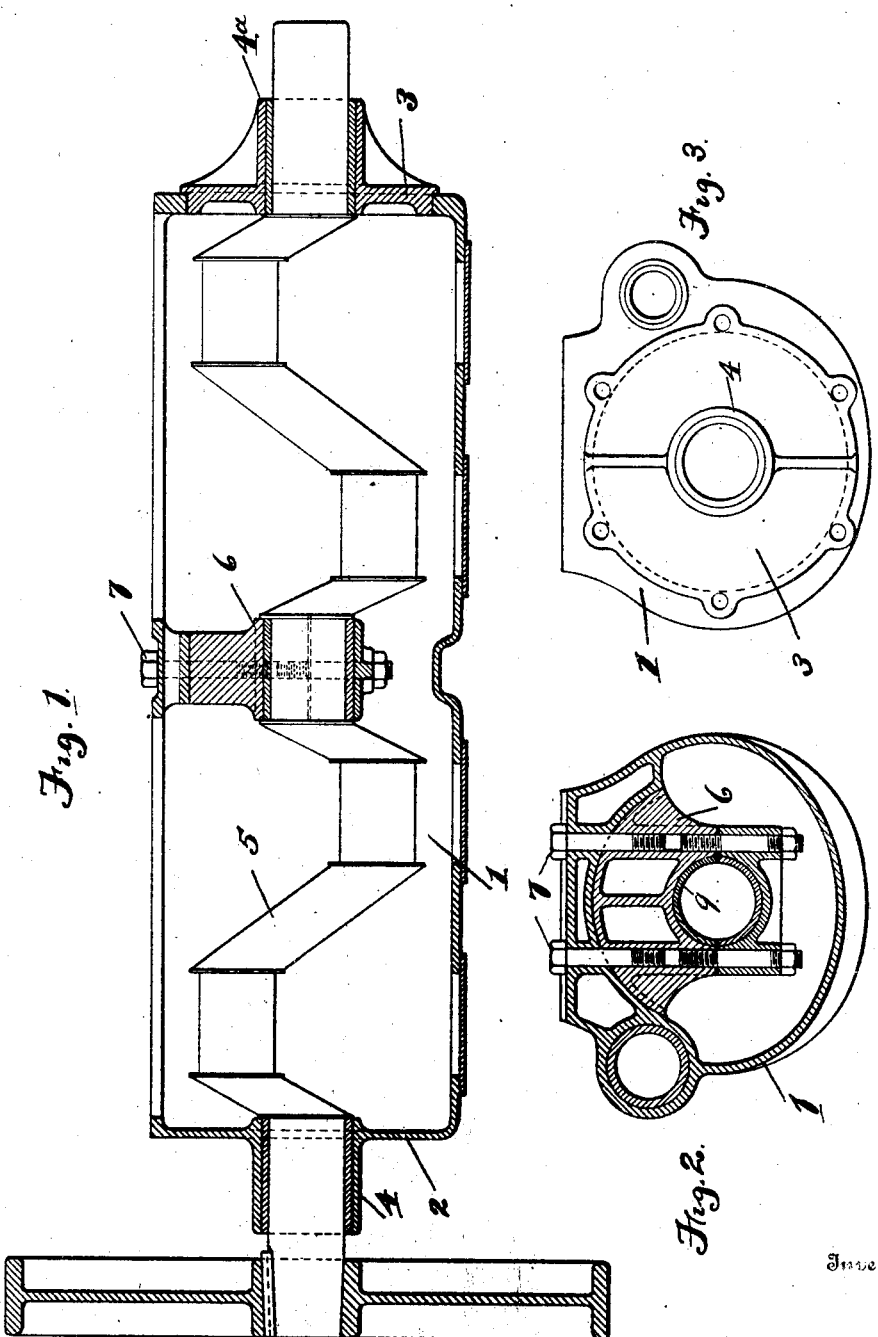

UNITED STATES PATENT OFFICE.

CHARLES HERRESHOFF, OF BRIDGEPORT, CONNECTICUT, ASSIGNOR TO HERRESHOFF MOTOR COMPANY, OF DETROIT, MICHIGAN, A CORPORATION OF MICHIGAN.

GAS OR GASOLENE ENGINE CONSTRUCTION.

940,650.

Specification of Letters Patent.  Patented Nov. 16, 1909.

Application filed April 30, 1907. Serial No. 371,120.

*To all whom it may concern:*

Be it known that I, CHARLES HERRESHOFF, a citizen of the United States, residing at Bridgeport, in the county of Fairfield and State of Connecticut, have invented certain new and useful Improvements in Gas or Gasolene Engine Construction, of which the following is a specification.

This invention relates to improvements in gas or gasolene engine construction, and particularly to the construction and arrangement of the crank-case and shaft bearings, the object being to provide a solid construction of crank case having continuity of strength throughout, and at the same time to reduce the weight thereof, thereby decreasing the cost thereof materially especially where expensive metals are employed, and further to so construct and arrange the bearings for the shaft that they may be quickly and readily removed without disturbing the crank-case.

With the above object in view, the invention consists in the novel features of construction hereinafter fully described, particularly pointed out in the claims, and clearly illustrated in the accompanying drawings, in which, Figure 1 is a longitudinal sectional view through the crank-case and shaft bearings, showing the crank-shaft therein; Fig. 2, a transverse section through the case and intermediate bearing, and Fig. 3, an end elevation of the crank-case showing the removable end-plate or door.

The crank case 1 is cylindrical in its general outline with one of the sides of the cylinder produced to a flat surface through which there are openings for the piston rod and which flat surface furnishes a seat for the engine cylinders. This crank casing is made as one integral structure with the side walls and one end wall in a unitary piece and with one end wall 3 made as a separate piece and removable therefrom. The end wall 2 which is integral with the body of the casing is provided centrally with a bearing $4^a$ for the shaft. The removable end 3 is also provided centrally with a bearing $4^a$ for the crank shaft. The end 3 engages in an opening in the end of the cylinder, which opening is concentric to the shaft axis, and is of a size sufficient to allow the crank shaft to be easily withdrawn, and to that end its diameter must be slightly greater than the extreme outer travel path of the crank pins, sufficiently greater to allow the projecting shoulders on each side of the crank pin to pass through the opening when the crank shaft is drawn along the axis of the shaft out from the crank case. Midway between the two ends of the crank case integral with the crank case and projecting inward from that side of the case upon which is the seat for the engines is a seat for the middle bearing to the shaft. This seat, which may be considered as an inverted saddle, is arched with a curvature substantially the same as that of the opening through the end of the cylinder, and the curvature of the arch is concentric to the axis of the shaft. In this inverted saddle engages hanging member 6, on which the engaging face is arched to correspond closely with the arch of the saddle in which it is attached. Concentric with the arch of the hanger is a journal box which in the assembled structure is in line with the bearings 4 and $4^a$. The hanger is secured in place in the inverted saddle by bolts 7 which pass through the walls of the casing 1 through the structure which comprises the inverted saddle and into the hanger 6. The hanger itself is made in two parts, one of which comprises the member which is adapted to engage the saddle and to engage over the shaft, and the other of which comprises the member which hangs from the lower part of the hanger and engages under the shaft. Within the opening for the shaft through the compound hanger thus formed may be inserted proper linings or bushings 9 which are arranged and adjusted or may be arranged and adjusted while the entire hanger is removed from its attachment to the casing and is separate therefrom. The two parts of the hanger are secured together by screw bolts 12 which pass through the lower member of the hanger and engage in the upper member thereof. This construction affords a very strong but light crank case with the provision for a three point support to the crank axle in a way such that the central support may be very accurately alined with the end supports even though it be made separate therefrom, inasmuch as the inverted saddle in which the hanger engages may be made with a boring tool centered with respect to the end bearings and the hanger itself may be made by lathe work and thus insure accuracy of fit between the parts and, consequently, accuracy of alinement in the bearings. The center member may be easily removed endwise by removing the bolts 7 after which the entire crank and the middle bearing slide readily through the opening which, in the assembled case, is closed by the end plate 3.

Having thus fully described my invention, what I claim as new, and desire to secure by Letters Patent of the United States, is;—

1. The combination with a crank-case having bearings carried by its end-walls and one of said end-walls removable, and carrying an intermediate bearing detachably secured thereto by means accessible from the exterior thereof, of a crank-shaft mounted in said bearings and removable endwise from the case by removing said end-wall and the securing means of intermediate bearing.

2. The combination with a crank case provided with an inverted saddle having an arched bearing surface concentric with the axis of the shaft, end bearings for said shaft, a hanger having an arched surface adapted to engage in the saddle and provided with a bearing concentric with the arched surface of said hanger, substantially as described.

3. The combination of a crank case made with one end wall and the side walls integral, a removable end wall, bearings in the said end walls for a crank shaft, a saddle adapted to engage a middle bearing member for said crank shaft, and a hanger adapted to engage said saddle and having an arched bearing surface adapted to pass through the end opening in said crank case, substantially as described.

4. In combination with a crank case provided with one end closure made integral therewith and having a shaft bearing central thereto, a removable end closure having a shaft bearing central thereto, a hanger arranged to support the shaft at the middle point having a bearing arranged to engage said shaft and an arched bearing arranged to engage the case, the said arched bearing being concentric to the shaft bearing, and means for securing the said bearing to said case, substantially as described.

In testimony whereof I affix my signature in presence of two witnesses.

CHARLES HERRESHOFF.

Witnesses:
T. C. CUMMING,
N. P. BUMP.